June 29, 1937.  E. J. LAUTERBUR  2,085,263
WEIGHING, SIFTING, AND DELIVERING APPARATUS
Filed Nov. 22, 1933  5 Sheets-Sheet 1
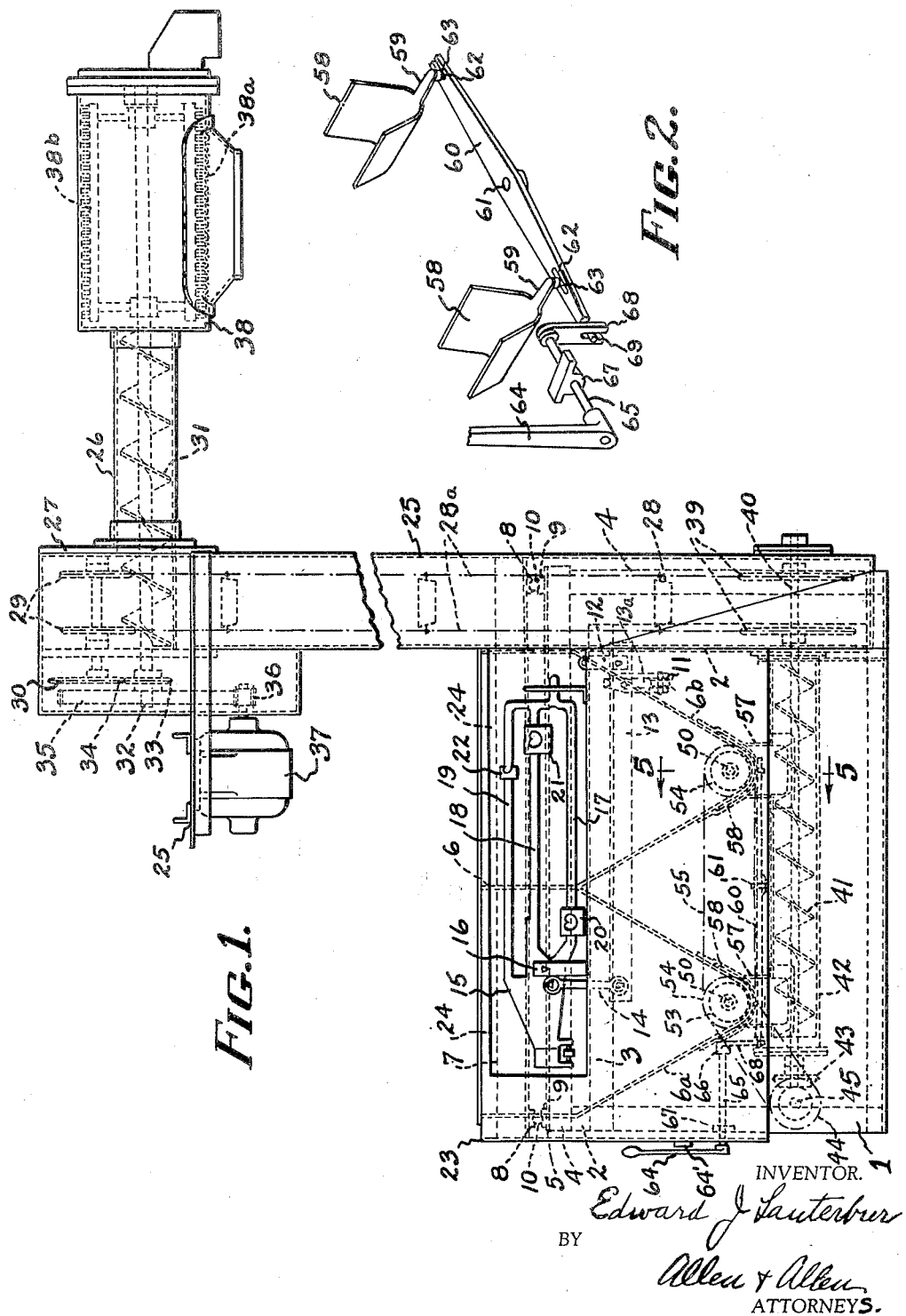
INVENTOR.
Edward J. Lauterbur
BY
Allen & Allen
ATTORNEYS.

June 29, 1937.  E. J. LAUTERBUR  2,085,263
WEIGHING, SIFTING, AND DELIVERING APPARATUS
Filed Nov. 22, 1933   5 Sheets-Sheet 2
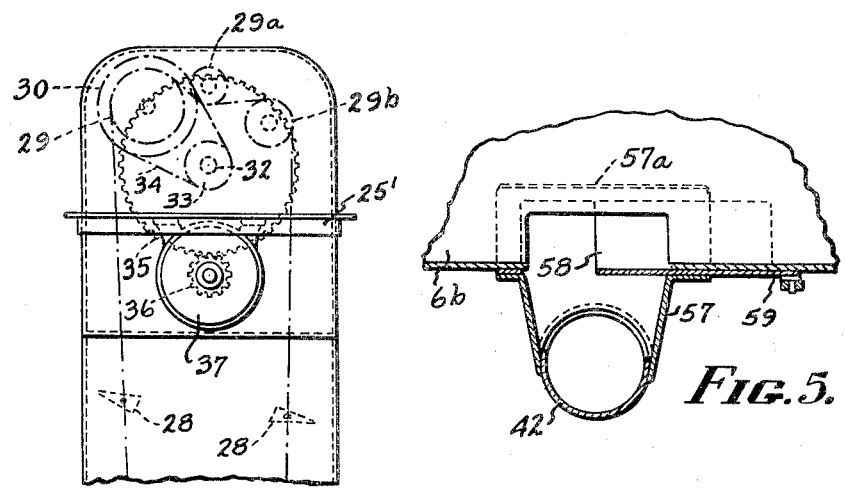
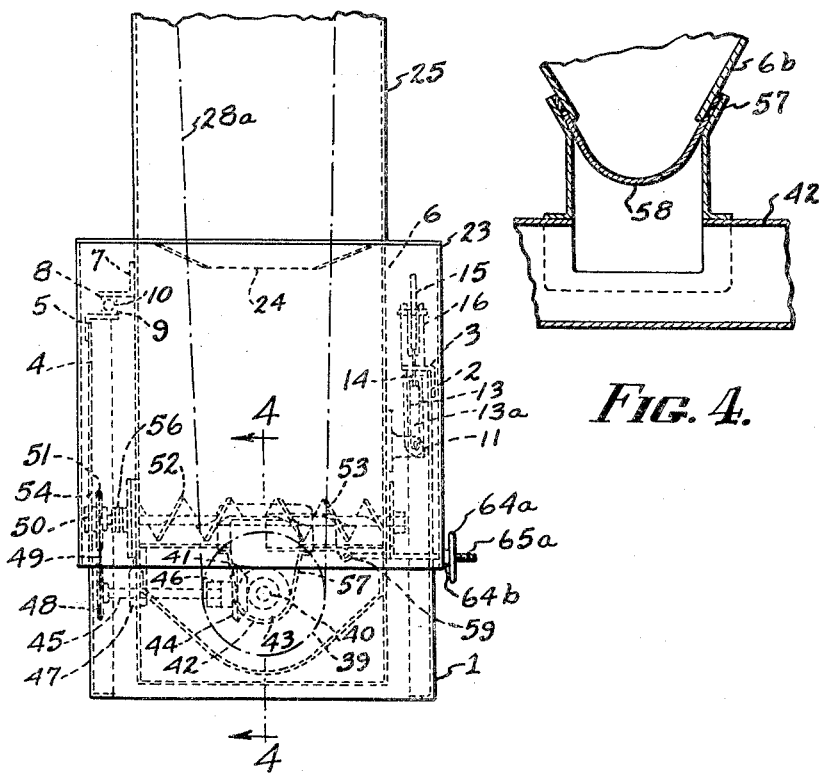
FIG. 5.
FIG. 4.
FIG. 3.
INVENTOR.
Edward J. Lauterbur
BY
Allen & Allen
ATTORNEYS.

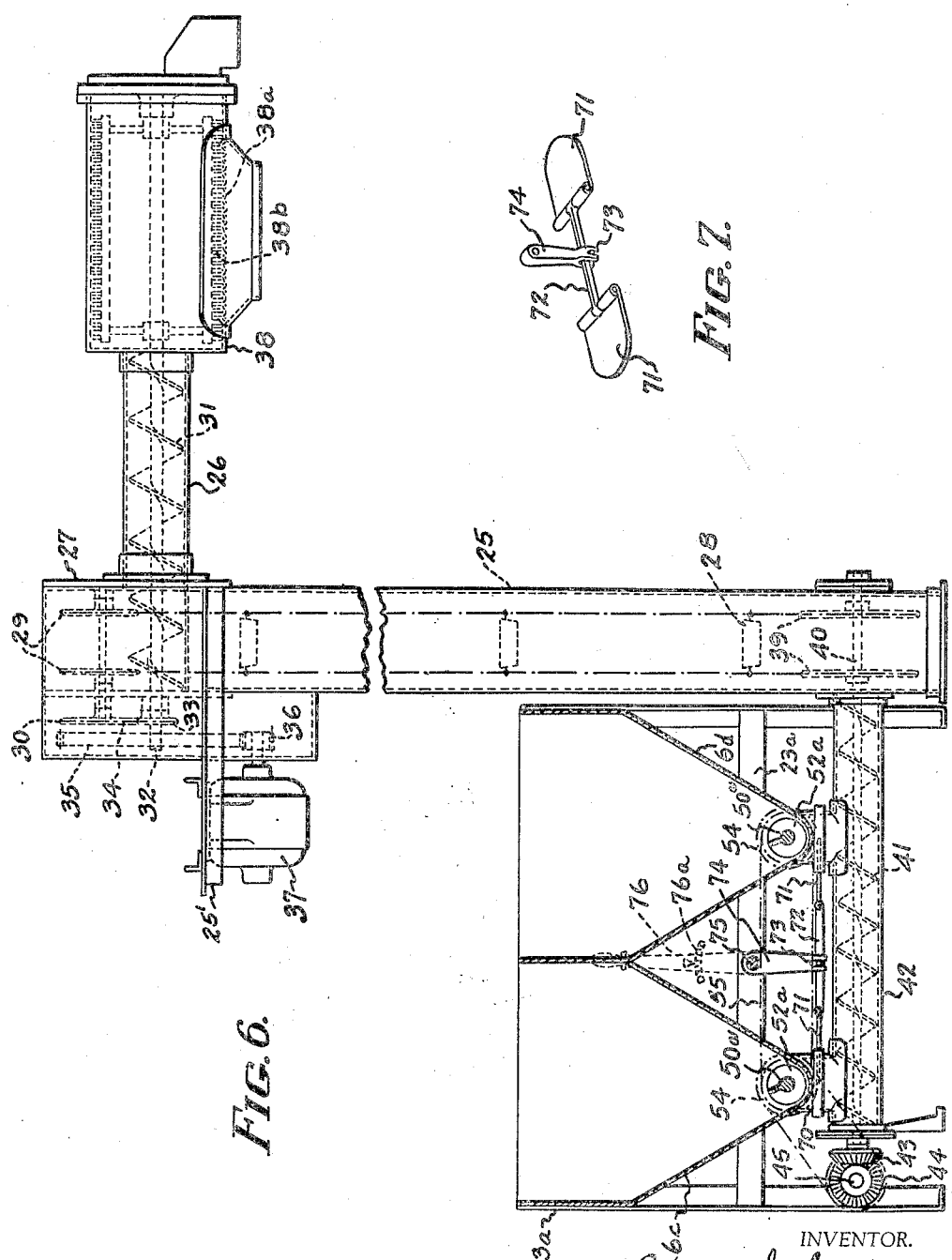

June 29, 1937.  E. J. LAUTERBUR  2,085,263
WEIGHING, SIFTING, AND DELIVERING APPARATUS
Filed Nov. 22, 1933   5 Sheets-Sheet 4

INVENTOR.
Edward J. Lauterbur
Allen + Allen
ATTORNEYS.

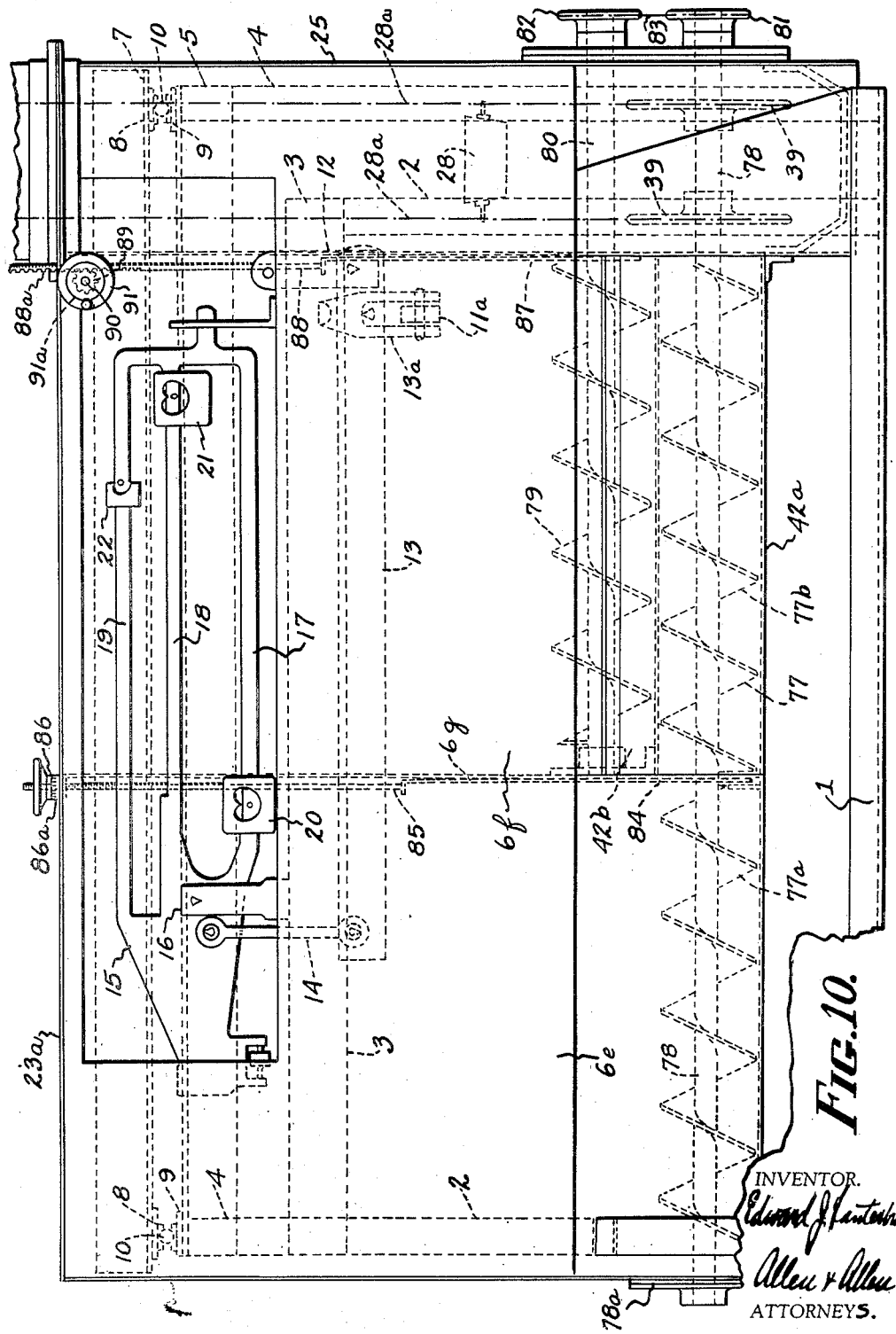

Patented June 29, 1937

2,085,263

UNITED STATES PATENT OFFICE 2,085,263

WEIGHING, SIFTING, AND DELIVERING APPARATUS

Edward J. Lauterbur, Sidney, Ohio, assignor to Peerless Bread Machinery Corporation, Sidney, Ohio, a corporation of Ohio Application November 22, 1933, Serial No. 699,206

14 Claims. (Cl. 221—96)

My invention relates to the treatment, handling and dispensing of pulverulent material, and more especially of flour and the like, in large quantities, as in bakeries.

The object of my invention is to facilitate the delivery of the flour or the like to the machinery used in preparing dough from the flour, such as a dough mixer, in exact amount desired, and, when more than one kind of flour or the like is used, to deliver the kinds of flour or the like in the exact proportions desired.

It is a particular object of my invention to effect such delivery by means of apparatus of general design well known in the art, wherein the material is delivered from a suitable bin device by an elevating device to a suitable sifting device which delivers it to the mixer. Such bin devices have been constructed with a weighing scale support so that by means of suitable tare indicating means on the scale, a net weighed quantity may be delivered from the bin device.

It is further the object of my invention to provide for delivery of the material thus weighed out, in a plurality of portions bearing a desired ratio to each other, as to quantity. It also is my object to deliver portions of the material from a bin device without provision for weighing; the means that determines the proportion of each kind of material also determining the total amount delivered. It is a further object of my invention, whether a scale be used or not, to provide conveniently operated manipulating means for the proportion determining device, as well as indicating means whereby the operator may readily gauge the proportions of the kinds of material; and to so provide these devices that the proportions are had with a high degree of accuracy without great attention on the part of the operator.

Other objects will appear in the course of the following description, illustrated by the accompanying drawings, in which—

Figure 1 is a side elevation of apparatus embodying my invention.

Figure 2 is a perspective detail view of the valves of the apparatus shown in Fig. 1, and the lever operating mechanism therefor.

Figure 3 is an end elevation, looking to the right in Figure 1, but showing a modification of the valve operating mechanism.

Figure 4 is a partial vertical section on the line 4—4 of Fig. 3, showing the neck and valve construction. Figure 5 is a partial vertical section on the line 5—5 of Fig. 1, further showing the neck and valve construction.

Figure 6 is a side elevation of apparatus embodying a modification of the invention, the bins being in vertical section on the line 6—6 of Fig. 8.

Figure 7 is a detail perspective view of the valves and their lever mechanism, as used in the device of Fig. 6.

Figure 10 is a side elevation of the apparatus of Fig. 9.

Figures 8, 9:
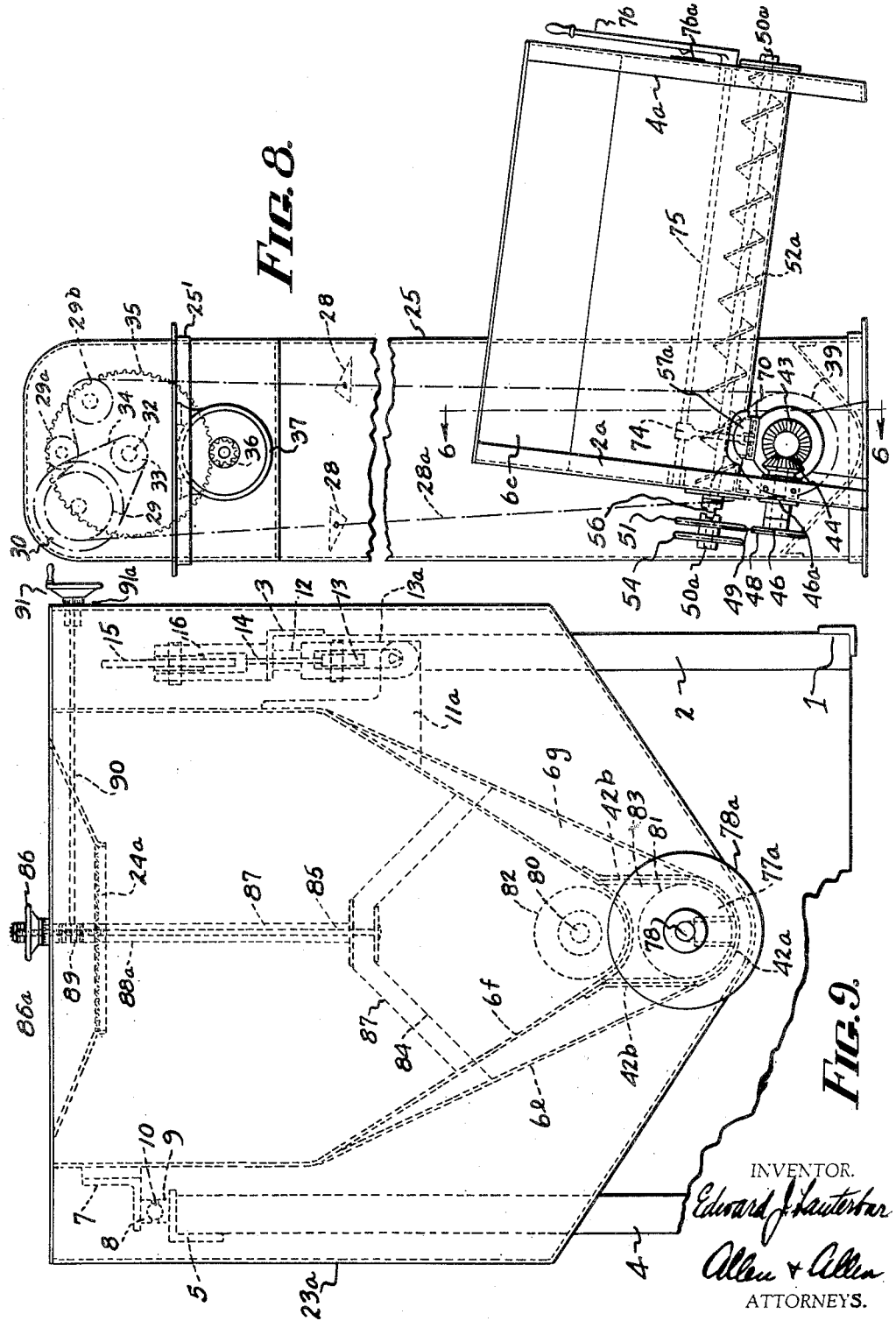
Figure 8 is an end elevation, looking to the right in Fig. 6.
Figure 9 is an end elevation of apparatus embodying a second modification of the invention.

In the example illustrated in Figs. 1 to 5, inclusive, and also in that illustrated in Figs. 9 and 10, a three-point scale suspension for the bin device is used. In the preferred construction shown, a floor frame or base 1 has upstanding posts 2 at its front, having their tops connected by a cross piece 3; and it has upstanding posts 4 at its rear, connected by a cross piece 5. These form a frame to support the bin 6, Figs. 1 and 2, or the bin 6', Figs. 9 and 10.

The bin devices are different in the two examples, but the suspension means is alike in both. The bin device has along its rear wall, near its top, a bar 7 with downwardly opening sockets 8 near its opposite ends. The rear cross piece 5 has upwardly opening sockets 9; and balls 10 are held in these sockets with the bin sockets 8 fitting down over them. The bin 6 of Figs. 1 to 5, inclusive, has the front bracket 11; and the bin 6' of the example of Figs. 9 and 10 has a front bracket 11a. A link 12 hangs from the front cross piece 3 and supports the right hand end of a beam 13, and link 13a connects to this beam 13 near the link 12 and to the bin bracket 11 or 11a. The opposite end of the beam 13 is connected by a link 14 to the scale beam 15 just to the left of the post 16 that extends up from the cross piece 3 and forms the fulcrum for the scale beam.

This scale beam 15 comprises a lower section 17, a middle section 18 and an upper section 19, on which slide poises 20, 21 and 22, respectively. The beam 15 swings up under the weight of material placed in the bin 6 or 6'; and by moving the lower poise 20 to the right until the beam swings down, the weight of material in the bin is indicated. The upper poises 21 and 22 are moved to the left to indicate the amount desired to be discharged from the bin. A casing 23, in the first example, or 23a in the second example, encloses the bin 6 or 6', respectively, with an opening 24 or 24a as an inlet to the open top of the bin 6 or 6', for placing material therein.

It will be seen that in either example the bin has two pivotal supports on the balls 10 at the rear, and one, at the front, where its bracket 11 or 11a is connected to the beam 13 by the link 13a; so that it may swing up and down with the scale beam 15, pivoting on the balls 10 at the rear.

In all of the examples the elevating and sifting and delivering mechanism are alike, comprising an upright elevator casing 25 with a horizontal conduit 26 connected to its top by a head casing 27. Buckets 28 are carried on a pair of chains 28a which run on upper sprocket wheels 29, 29a and 29b; the wheel 29 having turning with it the driving sprocket wheel 30. A helical screw conveyor 31 turns in the conduit 26 with a shaft 32 with a sprocket wheel 33 driving the elevator by means of chain 34 around wheels 33 and 30. A large gear 35 on shaft 32 meshes with a pinion 36 on the shaft of the motor 37 which hangs on a support 25' extending from the elevator casing 25. The screw conveyor 31 delivers into the casing 38, the open bottom of which is understood to connect with the top of the mixing machine, or other device, not shown, into which the material is to be delivered, by a telescopic joint, as disclosed, for instance, in copending application Serial No. 329,739, filed Jan. 2, 1929. As in that disclosure, the entire assembly of bin, elevator, conduit and sifter casing are suspended on the scale and allowed to move with it by means of the telescopic connection with the mixer or other receiving device.

The lower sprocket wheels 39 of the elevator are mounted on the shaft 40 with one end journaled in the wall of the elevator casing 25. This shaft has on it a helical screw conveyor 41, turning with it in a conduit 42 having one end leading into the elevator casing 25 and having the other end part of the conveyor shaft 40 journaled in the closure of its opposite end, outside which the shaft carries a bevel gear 43. This gear meshes with another bevel gear 44 on a shaft 45 extending to the rear in bearings 46 and 47, in the first example, or 46a, second example, and having on its rear end a sprocket wheel 48, with a chain 49. In all of the examples, each bin device comprises two compartments, each with downwardly converging sides joined by a semicircular bottom, forming a trough. The compartments 6a and 6b of the first example, or 6c and 6d of the second example, are assembled with their trough shaped bottoms parallel; and in each trough is a shaft 50 or 50a, respectively; the one nearest to the shaft 45 having on its rear end a sprocket wheel 51, around which the chain 49 passes from the wheel 48.

In the first example, Figs. 1 to 5, inclusive, each shaft 50 carries in the trough shaped bottom, at respective end portions thereof, left and right hand screw conveyors 52 and 53. In the second example, Figs. 6, 7 and 8, a single screw 52a is provided on each shaft 50a. Also in this example the bin compartments 6c and 6d are inclined, and the shaft 45 is inclined accordingly. In both of these examples, both screw shafts 50 or 50a have sprocket wheels 54, and clutches 56 sliding to connect the shafts with the wheels 54 or disconnect them therefrom. The one sprocket wheel 54 that is on the shaft with the wheel 51 is fixed thereto to turn therewith. Thus, either screw shaft may be driven, or both may be driven, driving the conveyor screws accordingly.

In the first example, each trough shaped bottom of a bin compartment has a middle outlet opening, and the right and left hand screws rotate so as to convey the material from both ends of the bottom into this opening; as best seen in Fig. 3. Necks 57 lead down from these openings into the lower conduit 42; being secured to the respective bin compartments 6a and 6b and to the conduit 42, but having upwardly extended wings 57a spaced from the outer surfaces of the bin compartment bottoms and forming guides in which slide the trough shaped slide valves 58 to open or close the respective necks to a greater or less extent. Each valve has at its front end, on its bottom, a stem 59, as best seen in Fig. 2.

In the example of Figs. 1 and 2, these valves are operated by a lever mechanism, comprising a yoke lever 60 with a middle fulcrum 61 on top of the lower conduit 42, and with slots in its ends at 62, receiving studs 63 extending down from the respective valve stems 59. A hand lever 64 at the left end of the bin structure, outside it, has a shaft 65 journaled in bearings 66 and 67 in the wall of the casing 23 and in the wall of the near compartment 6a, respectively; next to which latter bearing the shaft has a depending slotted arm 68 that receives in its slot a stud 69 on the adjacent end of the yoke lever 60. By swinging the hand lever 64, the yoke lever 60 is caused to slide the valves 58 in opposite directions, tending to close the neck of one compartment while tending to open the neck of the other compartment. At extreme position it may entirely close either compartment while entirely opening the other. By suitable index means 64' associated with the hand lever 64, the setting of the mechanism to deliver any proportions of material from the two bin compartments 6a and 6b may be accurately indicated.

In the example of Fig. 3, instead of the lever mechanism for operating the two valves 58, each valve is operated by a handwheel 64a threaded on a stem 65a; the inner end of this stem being pivoted to the stem 59 of the respective valve 58, and the handwheel being held from axial movement in its bearing in the front wall of the bin casing 23. This handwheel may have associated with it suitable index means 64b so that the setting of each valve 58 may be accurately indicated. In this example, the proportions will be determined according to the manual setting of each wheel 64a, instead of the setting of the single lever 64 as in the first example; to deliver any proportion of any total amount less than the full capacity of the neck 57. In the first example, equal parts of the two materials necessarily would total only half that capacity.

In the example of Figs. 6, 7 and 8, a lever mechanism is employed, inversely operating two valves, with the effect had in Figs. 1 and 2. Here, however, each neck 57a has a rectangular guide enlargement 70 in which slides a flat valve plate 71. The adjacent ends of these valve plates are connected by a rod 72 having projecting laterally from its middle at opposite sides studs 73. A forked arm 74 straddles the rod 72 and receives the studs 73 in slots in its end members, and is mounted on a shaft 75 journaled in the opposite end walls of the bin casing or support 23' and projecting out at the front thereof and having a hand lever 76, which has an index device to indicate the setting of the valve plates 71 after the manner of the mechanism of Figs. 1 and 2. In this example, the bin compartments are not mounted on a scale; being directly fixed on the frame 23', which has posts 2a and 4a, the latter shorter than the former, supporting the bin structure in its inclined position. This arrangement is such that the single neck 57a of each compartment bottom is close to the higher end thereof, and the single screw in each bottom conveys upwardly to the neck. This has the effect of avoiding compacting at the outlet; the greatest pressure of the material being at the low end, affording a freer discharge by the screws 52a.

In the example of Figs. 9 and 10, the bin compartments 6e and 6f are not arranged side by side, but in succession, with their trough shaped bottoms along a single median vertical plane. The two compartments are fixed together and mounted as a unit on the scale as previously described, and they and the scale are enclosed in the casing 23a, having the inlets 24a to the open tops of the compartments.

The compartment 6e farther from the elevator is deeper than the other one, 6f, and from that portion of its wall below the latter compartment 6f a conduit 42a extends into the elevator casing 25, and this conduit has braces 42b supporting it also on the bottom of the shallower compartment 6f. A screw 77, made up of sections 77a and 77b respectively in the bottom of the deeper compartment 6e and in the conduit 42a, is mounted on a shaft 78 journaled in end plate 78a in the outer end of the deep compartment and in the outer wall of the elevator casing 25, in which casing the screw has the sprocket wheels 39 of the elevator. In the bottom of the shallower compartment 6f is a screw 79 on a shaft 80 journaled in the partition 6g that divides the two compartments 6e and 6f and in the outer wall of the elevator casing 25, above the sprocket wheels 39. The two shafts 78 and 80 extend outside the casing 25 and have sprocket wheels 81 and 82 respectively, connected by a sprocket chain 83. Thus, the elevator mechanism drives the lower long screw, and the latter drives the upper short screw. This short screw conveyor 79 discharges through an opening into the casing 25; and the nearer wall of the deeper compartment 6e, below the partition 6g, where it opens for discharge by the long screw 77, has its opening adapted to be closed by a valve plate or gate 84, sliding up and down on the partition 6g, with a stem 85 connected to its top and extending up through the top of the casing 23a, where it has threaded on it a handwheel 86, with index means 86a. This valve plate or gate 84 slides between the screw sections 77a and 77b, which are spaced only sufficiently to admit it; the effect of the two sections, in conveying, being practically that of a single continuous screw. A similar valve plate or gate 87 serves to close the outlet for the upper or short screw conveyor 79; sliding up and down on the end of the bin and having a stem 88 connected to its top, which has rack teeth 88a on its upper end meshing with a pinion 89 on a shaft 90 that extends out through the front of the casing 23a and has a handwheel 91 with index means 91a.

In this example the adjustment for proportion of materials from the two compartments 6e and 6f is effected by raising the two gates 84 and 87 to the desired degrees; being similar to that of the valves 58 in the example of Fig. 3. The screws, rotating at equal speeds, or at any other constant ratio, will deliver quantities proportionate to the degrees of opening of the two gates 84 and 87; and any proportion of any total quantity less than the capacities of the outlets controlled by them may be had.

In any of the examples, the total amount of material, such as flour, may be weighed, or the bins may be filled to the desired degree according to the weight indicated by the scale, each compartment with the desired kind of material. Then, by adjusting the valves or gates as desired, the device will deliver the two materials in the desired proportions merely as a result of their continuous operation. In those examples, as in Figs. 1 to 8, inclusive, having clutch means by which the screw conveyor of either bin compartment may be rendered inoperative, only one compartment may be used, delivering one kind of material, with its gate entirely closed, if as in Fig. 3, and the operation of the unused screw conveyor is avoided. This may be substantially accomplished in Figs. 1 and 2, where one gate must be partly open if the other is not fully open; as the stoppage of the screw will avoid discharge from the unused compartment. It will be seen that, in any example, the adjustments of the gates may be changed while the mechanism is running. The gate or valve adjustment is simple compared to varying the speeds of the screw conveyors for the same purpose.

I have disclosed certain details associated with others in the various examples, but it will be understood that, the principles of operation being known, each example may be varied to include details from others without the need of invention. Other modifications may occur in practice, and while a precise disclosure of certain preferred examples is made, it will be understood that I am not limited thereto, but what I claim as new and desire to secure by Letters Patent is:

1. In combination with an apparatus for delivering a plurality of finely divided solid materials in desired proportions, comprising containers for the respective materials and means operative to convey the materials from the containers, to which the containers have respective outlet openings, means by which the effective outlet capacity of each outlet opening relative to that of each other outlet opening may be varied while the apparatus is in operation.

2. In combination with an apparatus for delivering a plurality of finely divided solid materials in desired proportions, comprising containers for the respective materials and means operative to convey the materials from the containers, to which the containers have respective outlet openings, means to simultaneously and inversely vary the effective outlet capacity of each outlet opening relative to that of each other outlet opening.

3. In combination with an apparatus for delivering a plurality of finely divided solid materials in desired proportions, comprising containers for the respective materials and means operative to convey the materials from the containers, to which the containers have respective outlet openings, devices in the respective containers operative to move material therein to the respective outlet openings, and a single means to vary the effective outlet capacity of each outlet opening relative to that of each other outlet opening.

4. Apparatus for delivering a plurality of finely divided solid materials in desired proportions, comprising containers for the respective materials, means operative to convey the materials from the containers, to which the containers have respective medianly located outlet openings, devices in the respective containers, two in each container, each operative to move material in the container from an opposite end portion of the container to the respective medianly located outlet opening, and means to vary the effective outlet capacity of each outlet opening relative to that of each other outlet opening.

5. Apparatus as set forth in claim 4, in which the means to vary the effective outlet capacities of the outlet openings is a single means and varies said capacities simultaneously and inversely.

6. Apparatus as set forth in claim 3, including means whereby one of the devices that moves material to an outlet opening actuates another one of the devices that moves material to an outlet opening.

7. Apparatus as set forth in claim 3, including operatively connecting means whereby one of the material moving devices in a container actuates another one of said devices, and means whereby either one of said devices may be connected to or disconnected from said operatively connecting means.

8. Apparatus as set forth in claim 3, including means whereby the means to convey materials away from the containers actuates the devices that move the materials to the respective outlet openings.

9. Apparatus as set forth in claim 3, including operatively connecting means whereby the means to convey materials away from the containers actuates the devices that move the materials to the respective outlet openings, and means whereby either one of said devices may be connected to or disconnected from said operatively connecting means.

10. In combination with a bin having a plurality of compartments each with a narrowed trough shaped bottom with an outlet opening downwardly therefrom and agitating and conveying devices operative in the respective bottoms, conveying toward the respective outlets and a conveying device below and operative past said outlets and having inlets communicating with the respective outlets and having means for simultaneously actuating the first mentioned conveying devices and the second mentioned conveying device, valves operative to vary the conductive capacity of the respective communicating outlets and inlets, and means operative to adjust each valve to a different position, to vary the proportions of materials delivered from the respective compartments to the second mentioned conveying device.

11. Apparatus as set forth in claim 10, in which the valves are slidable across the respective communicating outlets and inlets, and in which the means to adjust the valves connects a plurality of the valves together and comprises a single manipulating member movable in one direction or another and thereby tending to close one connected valve while tending to open the other connected valve, whereby the proportions delivered may be simultaneously and inversely varied.

12. In combination with two bin compartments each having an outlet in its bottom and means to force material in the compartment toward and out through the outlet, and conveying means receiving the materials from the outlets, valves slidable to close the respective outlets or to open them in various degrees, a lever fulcrumed intermediate of its ends and having its ends connected to the respective valves to slide them, each in direction opposite to that of sliding of the other when the lever is swung, and means for actuating the forcing means of the two compartments and for actuating said conveying means simultaneously with the actuation of the forcing means.

13. In combination with two bin compartments, one having its bottom part extending below the bottom part of the other, a conduit leading from the bottom part of the one compartment under the bottom of the other compartment, said other compartment and said conduit having adjacent discharge openings, a conveying device operative in the bottom of said other compartment toward its discharge opening, a conveying device operative in the bottom of the one compartment and in said conduit to discharge material from the one compartment through the conduit and out through the conduit discharge opening, a valve for closing or more or less opening the conduit, and a valve for varying the discharge capacity of the opening from said other compartment.

14. In combination with a bin structure comprising a plurality of compartments and an elevator at one end of said structure, into which said compartments open and delivering and sifting means at the upper part of the elevator, into which the elevator discharges and means to force materials from the respective compartments into the elevator, means to more or less obstruct the passage of the materials from the respective compartments, in different degree for each compartment, said bin structure, elevat and delivering and sifting means being co nected for unitary movement.

EDWARD J. LAUTERBUR